INVENTOR.
WAYNE C. SHANK

ABSTRACT OF THE DISCLOSURE

A method for securing a threaded element on a shaft comprising the steps of machining the threads on the element to a predetermined interference fit with the shaft on which it will be secured. The nut is heated to enable threading onto the shaft. The predetermined interference fit is selected so that when the element is cooled an internal hoop stress is generated that is sufficiently large to prevent loosening by circumferential enlargement of the element in a high centrifugal force field.

---

The present invention relates to a method for securing an element on a threaded shaft and more particularly to a method for securing a threaded element on a shaft that is exposed to a high centrifugal force field.

In recent years the small gas turbine engine has been widely used for small power plant requirements. One of the essential elements of this type of engine is a rotating bladed element which pressurizes air in the gas turbine. Because the engine is so small the bladed element must rotate at extremely high r.p.m.'s to operate efficiently. This type of environment creates a centrifugal force field of staggering proportions. An example of the magnitude of the field may be found in one type of engine that operates at approximately 60,000 revolutions per minute. For this engine the centrifugal force in pounds, acting on a particular point in the impeller, is equal to almost 100,000 times its radius from the axis of rotation expressed in inches.

This extremely high centrifugal force field creates a problem in the use of a threaded element, such as a sleeve, to secure the rotor on a shaft. The high centrifugal force field acts on the sleeve to generate a hoop stress which actually causes the element to grow sufficiently to loosen it on the threaded shaft. When this happens the threads no longer can exert an axial holding force to securely hold the impeller in place.

In the past threaded elements have been secured in this type of environment by various lock washers and locking wire devices. While these devices prevent rotation of the threaded element, they do not restrain expansion of the element to the point where an axial holding force is no longer possible.

Accordingly, it is an object of the present invention to provide a method which will enable the effective and secure attachement of a threaded element in a high centrifugal force field.

The above ends are achieved by machining the threaded portions of an internally threaded element to a predetermined interference fit with a threaded shaft over which the element is to be positioned. The element is heated to a temperature high enough to enable it to be threaded onto the shaft. The predetermined interference fit is selected so that an internal hoop stress is generated in the element upon cooling, the stress being sufficiently great to prevent circumferential enlargement of the element in the high centrifugal force field.

The above and other related objects and features of the present invention will be apparent from a reading of the description shown in the accompanying drawings and the novelty thereof pointed out in the appended claims.

Figure 1:
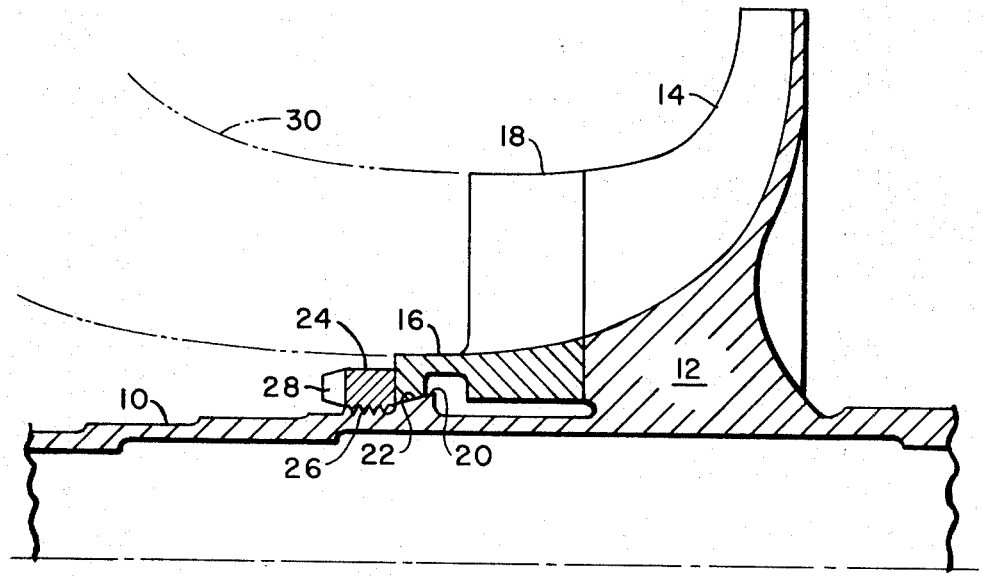
FIG. 1 is a longitudinal section view of a bladed rotatable turbomachine element with which the present invention may be used.
Figure 2:
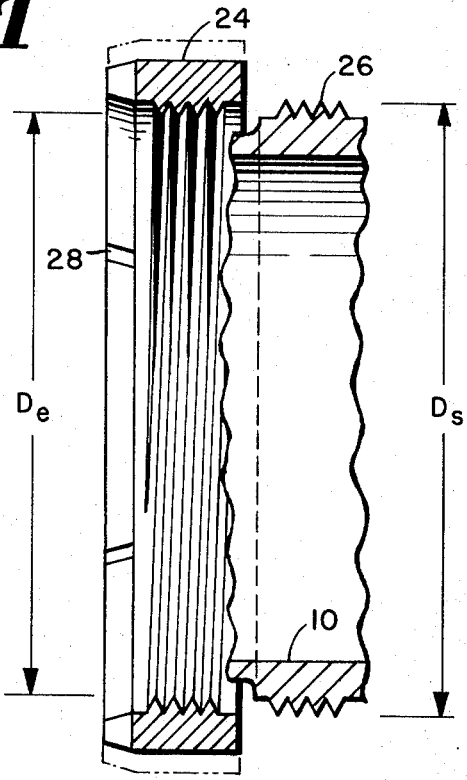
FIG. 2 is a greatly enlarged fragmentary view of the turbomachine assembly shown in FIG. 1.

As shown in FIG. 1, there is a suitably journaled rotatable shaft 10 and an internal bladed impeller hub 12 having radially extending blades 14. An inducer hub 16 having a series of inducer blades 18 is telescoped over a portion of shaft 10 and abuts impeller hub 12. A conical pilot shoulder 20 on the shaft 10 and a corresponding conical shoulder 22 on the inducer hub 16 center it on shaft 10. An internally threaded element 24 is screwed onto threaded portion 26 of shaft 10 to hold the inducer hub 16 against the impeller hub 12. Notches 28 are provided in the end face of element 24 to enable the use of a suitable tool to thread element 24 on and off shaft 10.

In operation the centrifugal impeller receives air from an inlet (shown in phantom and indicated generally by reference character 30) and rotates at a high rate of speed to accelerate the air for subsequent diffusion and pressure increase. The high rate of speed at which the shaft 10 rotates causes a hoop stress to be built up in the element 24. In accordance with the present invention the following method is used to assemble the element 24 on shaft 10 to avoid tangential enlargement in this environment.

The threaded element 24 is machined to have a pitch diameter $D_e$ which has a predetermined interference fit relative to the pitch diameter $D_s$ of the threaded portion 26 of shaft 10. To position the element 24 on the threaded portion 26, the nut 24 is heated to a high enough temperature to cause it to expand and provide sufficient clearance to be threaded onto shaft 10. Generally this temperature is just below the heat treat drawing temperature of the material used for the element 24. When the element 24 cools down it shrinks onto threaded portion 26, thereby generating an internal hoop stress.

The predetermined interference fit $(D_s-D_e)$ is selected so that the internal hoop stress in the element 24 at least equals the tangential hoop stress that would be generated by the centrifugal force field in which the assembly would be situated. It is pointed out that the type of material and its expansion rate size will be taken into account in this determination, as is apparent to those skilled in the art. For example, if the centrifugal force field at the maximum anticipated r.p.m. of the impeller generates a hoop stress in the sleeve of 50,000 p.s.i., the dimensions of the interference fit are selected so that the threaded element 24 has a self-generated hoop stress in a static state of at least 60,000 p.s.i. As a result, there will be no expansion of the element 24 as long as the hoop stress caused by the centrifugal force field does not exceed the self-generated internal hoop stress that was placed in the element 24. By so doing, the element 24 remains in tight engagement with the threaded portion 26 of shaft 10 and maintains a constant axial holding force for the inducer hub 16.

For removal of the element 24 it is simply heated to the assembly temperature and threaded off of the shaft 10.

While the above method has been described in connection with a bladed turbomachine element it should be apparent to those skilled in the art that it may be employed for other assemblies with equal advantages.

Accordingly, what is novel and desired to be secured by Letters Patent of the United States is:

1. A method of axially holding a bladed inducer element on a threaded shaft extending from a bladed impeller, rotatable at a rate producing a given high centrifugal force field so that the blades of said inducer and impeller are in alignment, said method comprising the steps of:

machining the threaded portions of an internally threaded, generally annular nut to a predetermined interference fit with said threaded shaft;

heating said nut to a temperature high enough to enable the element to be threaded on said shaft;

threading said heated nut over the threaded portions of said shaft to hold said inducer against said impeller; and allowing the nut to cool producing an interference fit with the threaded shaft, said predetermined interference fit being selected so that upon cooling an internal hoop stress in generated in said nut that is greater than the tangential hoop stress imposed on said nut by said given centrifugal force field, thereby preventing tangential enlargement of said nut and releasing of said axial holding force in said high centrfugal force field.

References Cited

UNITED STATES PATENTS

| | | | |
|---|---|---|---|
| 1,817,808 | 8/1931 | Eaton | 29—447 |
| 2,787,426 | 4/1957 | Roubal | 29—447 XR |
| 2,852,652 | 9/1958 | Rose et al. | 29—447 XR |
| 2,438,867 | 3/1948 | Rockwell et al. | |
| 1,692,291 | 11/1928 | Dowd | 415—199 A |
| 2,652,271 | 9/1953 | Gaubatz | 416—215 X |
| 2,960,937 | 11/1960 | Wright et al. | 415—199 A |

FOREIGN PATENTS

| | | | |
|---|---|---|---|
| 40,565 | 1/1910 | Austria | 29—447 |

CHARLIE T. MOON, Primary Examiner

U.S. Cl. X.R.

29—404, 447; 287—52 SH; 415—199; 416—186, 215